US012420550B2

(12) United States Patent
Shiozawa et al.

(10) Patent No.: US 12,420,550 B2
(45) Date of Patent: Sep. 23, 2025

(54) LIQUID EJECTING HEAD AND LIQUID EJECTING APPARATUS

(71) Applicant: SEIKO EPSON CORPORATION, Tokyo (JP)

(72) Inventors: Yu Shiozawa, Shiojiri (JP); Hitoshi Takaai, Azumino (JP); Takahiro Kanegae, Shiojiri (JP); Eiju Hirai, Azumino (JP)

(73) Assignee: SEIKO EPSON CORPORATION (JP)

( * ) Notice: Subject to any disclaimer, the term of this patent is extended or adjusted under 35 U.S.C. 154(b) by 230 days.

(21) Appl. No.: 18/457,771

(22) Filed: Aug. 29, 2023

(65) Prior Publication Data

US 2024/0066868 A1 Feb. 29, 2024

(30) Foreign Application Priority Data

Aug. 30, 2022 (JP) ................................ 2022-136574

(51) Int. Cl.
*B41J 2/14* (2006.01)

(52) U.S. Cl.
CPC ....... *B41J 2/14233* (2013.01); *B41J 2/14201* (2013.01); *B41J 2002/14241* (2013.01); *B41J 2002/14338* (2013.01); *B41J 2202/12* (2013.01)

(58) Field of Classification Search
CPC ................ B41J 2/14233; B41J 2/14201; B41J 2002/14241; B41J 2002/14338; B41J 2202/12
See application file for complete search history.

(56) References Cited

U.S. PATENT DOCUMENTS

2014/0267478 A1* 9/2014 Yokoyama .......... B41J 2/14233 347/70
2018/0264830 A1 9/2018 Tomimatsu

FOREIGN PATENT DOCUMENTS

JP 2018-153926 A 10/2018

* cited by examiner

*Primary Examiner* — Geoffrey S Mruk
(74) *Attorney, Agent, or Firm* — Harness, Dickey & Pierce, P.L.C.

(57) ABSTRACT

A liquid ejecting head includes: a nozzle substrate having a nozzle configured to eject liquid; a pressure chamber substrate having a pressure chamber in which a pressure for ejecting liquid through the nozzle is applied to liquid and an absorption chamber adjacent to an upstream portion of the pressure chamber and configured to absorb vibration of liquid that occurs when a pressure is applied to the liquid in the pressure chamber; a first piezoelectric element associated with the pressure chamber and configured to be driven by voltage application; and a second piezoelectric element associated with the absorption chamber and configured to be driven independently of the first piezoelectric element by voltage application.

16 Claims, 9 Drawing Sheets

LIQUID EJECTING HEAD AND LIQUID EJECTING APPARATUS

The present application is based on, and claims priority from JP Application Serial Number 2022-136574, filed Aug. 30, 2022, the disclosure of which is hereby incorporated by reference herein in its entirety.

BACKGROUND

1. Technical Field

The present disclosure relates to a liquid ejecting head and a liquid ejecting apparatus.

2. Related Art

In the liquid ejecting head disclosed in JP-A-2018-153926, pressure chambers and an absorption chamber that absorbs vibration of liquid in the pressure chambers are located in different substrates and away from each other, and hence, the efficiency of absorbing vibration of the liquid in the pressure chambers is low. To address this, a configuration having pressure chambers and an absorption chamber provided at adjacent positions in the same substrate is being studied. In this configuration, the absorption chamber has at least a vibration plate, which vibrates in accordance of a pressure fluctuation to damp the pressure fluctuation. This makes it possible to mitigate transmission of the pressure fluctuation to adjacent pressure chambers and the like and prevent a deterioration in ejection characteristics.

However, the liquid ejecting head described above has various other issues. For example, the pressure chambers need to be timeously filled with liquid to maintain the ejection characteristics, and the size of the head is required to be downsized. Hence, provision of a liquid ejecting head that provides solutions for such various issues is desired.

SUMMARY

The present disclosure can be implemented in the following aspects.

A first aspect of the present disclosure provides a liquid ejecting head. The liquid ejecting head includes: a nozzle substrate having a nozzle configured to eject liquid; a pressure chamber substrate having a pressure chamber in which a pressure for ejecting liquid through the nozzle is applied to liquid and an absorption chamber adjacent to an upstream portion of the pressure chamber and configured to absorb vibration of liquid that occurs when a pressure is applied to the liquid in the pressure chamber; a first piezoelectric element associated with the pressure chamber and configured to be driven by voltage application; and a second piezoelectric element associated with the absorption chamber and configured to be driven independently of the first piezoelectric element by voltage application.

A second aspect of the present disclosure provides a liquid ejecting apparatus. The liquid ejecting apparatus includes: the liquid ejecting head according to the above first aspect; and a controller configured to control ejection operation of ejecting liquid from the liquid ejecting head.

DESCRIPTION OF EMBODIMENTS

A. First Embodiment

A1. Configuration of Liquid Ejecting Apparatus 1

Figure 1:
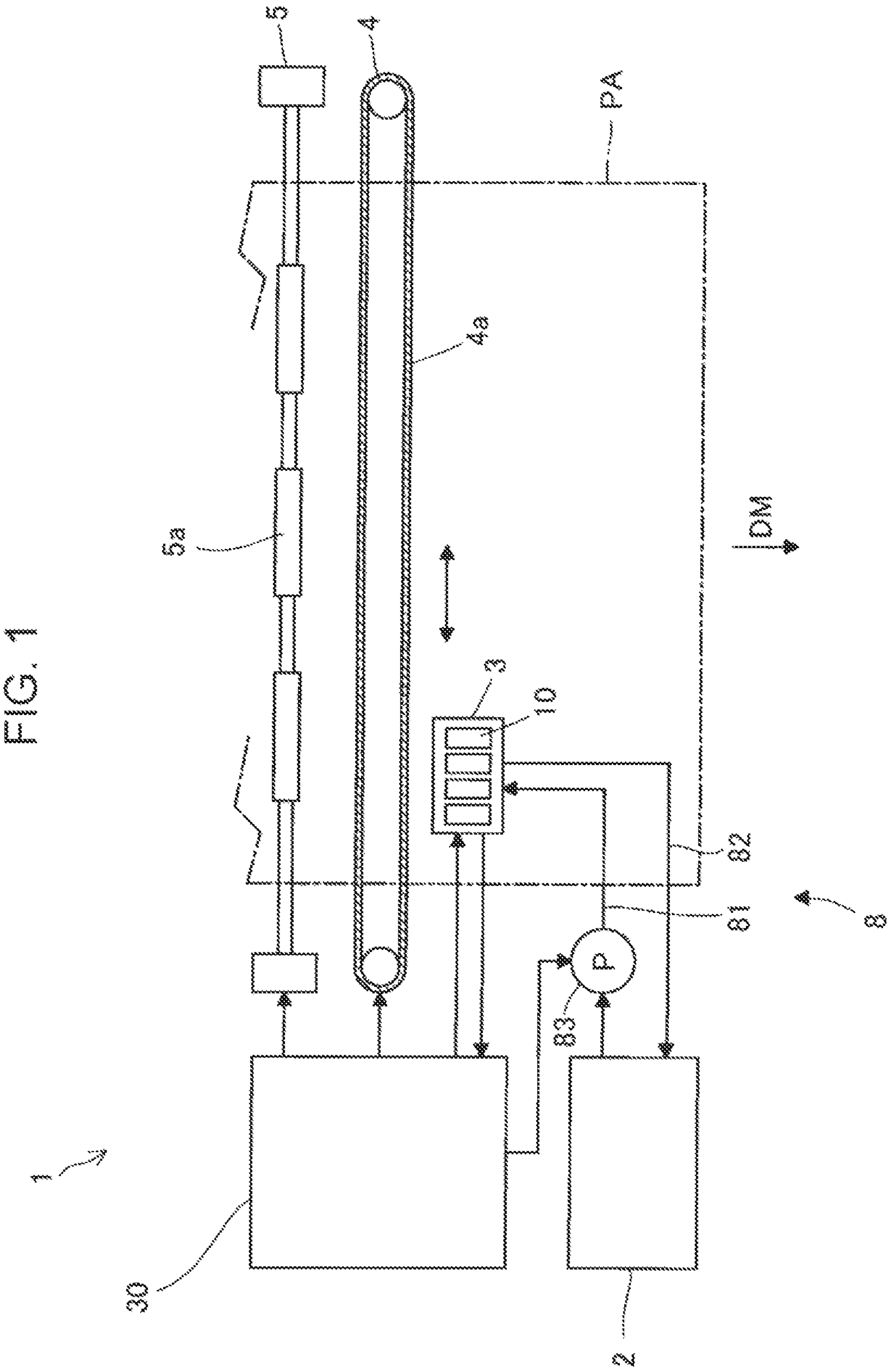
FIG. 1 is an explanatory diagram illustrating the overall configuration of a liquid ejecting apparatus in a first embodiment of the present disclosure.

FIG. 1 is an explanatory diagram illustrating the overall configuration of a liquid ejecting apparatus 1 according to a first embodiment of the present disclosure. In the present embodiment, the liquid ejecting apparatus 1 is an ink jet printer that ejects ink, which is an example of a liquid, onto a print sheet PA, which is a print medium, (hereinafter simply referred to as "sheet PA") to form an image. The liquid ejecting apparatus 1 may be configured to eject ink onto any kinds of media, such as fabrics and resin films, as ink ejection targets, instead of onto the sheet PA.

The liquid ejecting apparatus 1 includes a liquid ejecting head 10 that ejects ink, a liquid container 2 that stores ink, a carriage 3 having the liquid ejecting head 10, a carriage transportation mechanism 4 that transports the carriage 3, a medium transportation mechanism 5 that transports the sheet PA, and a controller 30. The controller 30 is configured to control liquid ejection.

Examples of specific configurations of the liquid container 2 include a cartridge configured to be detachably attached to the liquid ejecting apparatus 1, an ink pack in the form of a bag formed of a flexible film, and an ink tank configured to be refilled with ink. Note that any kind of ink may be stored in the liquid container 2. The liquid ejecting apparatus 1 includes, for example, a plurality of liquid containers 2 associated with four colors of ink. The four colors of ink are, for example, cyan, magenta, yellow, and black. The liquid container 2 may be mounted on the carriage 3.

The liquid ejecting apparatus 1 includes a circulation mechanism 8 that circulates ink. The circulation mechanism 8 includes a supply flow path 81 that supplies ink to the liquid ejecting head 10, a collection flow path 82 that collects the ink discharged from the liquid ejecting head 10, and a pump 83 that causes the ink to flow.

The carriage transportation mechanism 4 includes a transportation belt **4*a* and a motor for transporting the carriage 3. The medium transportation mechanism 5 includes a transportation roller 5*a* and a motor for transporting the sheet PA. The carriage transportation mechanism 4 and the medium transportation mechanism 5 are controlled by the controller 30. The liquid ejecting apparatus 1 ejects ink droplets onto the sheet PA to perform printing by causing the carriage transportation mechanism 4 to transport the carriage 3 while causing the medium transportation mechanism 5** to transport the sheet PA.

Figure 2:
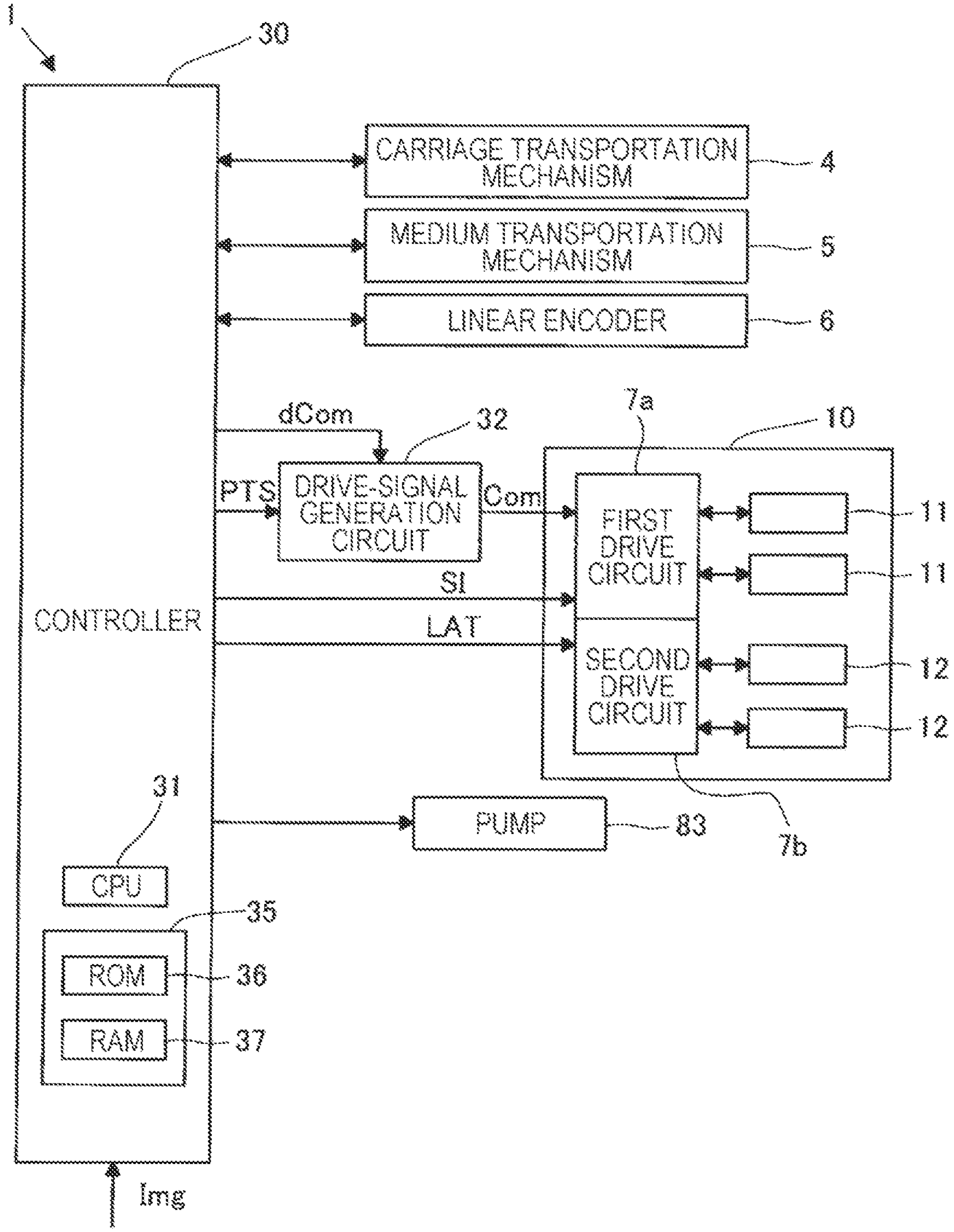
FIG. 2 is a block diagram illustrating the liquid ejecting apparatus.

FIG. 2 is a block diagram illustrating the liquid ejecting apparatus 1. As illustrated in FIG. 2, the liquid ejecting apparatus 1 includes a linear encoder 6. The linear encoder 6 is located at a position where the linear encoder 6 can detect the position of the carriage 3. The linear encoder 6 obtains information on the position of the carriage 3. The linear encoder 6 outputs an encoder signal to the controller 30 along with the movement of the carriage 3.

The controller 30 includes at least one CPU 31. The controller 30 may include an FPGA instead of or in addition to the CPU 31. The controller 30 includes a storage unit 35. The storage unit 35 includes, for example, ROM 36 and RAM 37. The storage unit 35 may include EEPROM or PROM. The storage unit 35 is configured to store print data Img supplied from a host computer. The storage unit 35 stores a control program for the liquid ejecting apparatus 1.

"CPU" is an abbreviation for "central processing unit". "FPGA" is an abbreviation for "field-programmable gate array". "RAM" is an abbreviation for "random access memory". "ROM" is an abbreviation for "read-only memory". "EEPROM" is an abbreviation for "electrically erasable programmable read-only memory". "PROM" is an abbreviation for "programmable read-only memory".

The controller 30 generates a signal for controlling the operation of each unit in the liquid ejecting apparatus 1. The controller 30 is configured to generate a print signal SI and a waveform specifying signal dCom. The print signal SI is a digital signal for specifying the type of operation of the liquid ejecting head 10. The print signal SI is configured to specify whether to supply a drive signal Com to each piezoelectric element 11. The waveform specifying signal dCom is a digital signal that defines the waveform of the drive signal Com. The drive signal Com is an analog signal for driving each piezoelectric element 11.

The liquid ejecting apparatus 1 includes a drive-signal generation circuit 32. The drive-signal generation circuit 32 is electrically coupled to the controller 30. The drive-signal generation circuit 32 includes a DA conversion circuit. The drive-signal generation circuit 32 generates the drive signal Com having a waveform defined by the waveform specifying signal dCom. The controller 30, when receiving an encoder signal from the linear encoder 6, outputs a timing signal PTS to the drive-signal generation circuit 32. The timing signal PTS defines the timing at which the drive signal Com is to be generated. The drive-signal generation circuit 32 outputs the drive signal Com each time the timing signal PTS is received.

A first drive circuit 7*a* and a second drive circuit 7*b* are electrically coupled to the controller 30 and the drive-signal generation circuit 32. The first drive circuit 7*a* switches between whether or not to supply the drive signal Com to each first piezoelectric element 11 in accordance with the print signal SI. The second drive circuit 7*b* switches between whether or not to supply the drive signal Com to a second piezoelectric element 12 in accordance with the print signal SI. The drive-signal generation circuit 32 generates a drive signal for each of the first drive circuit 7*a* and the second drive circuit 7*b*. Note that the configurations and operation of the first piezoelectric element 11 and the second piezoelectric element will be described in detail later. Each of the drive circuits 7*a* and 7*b* is configured to select, in accordance with the print signal SI, a latch signal LAT, and a change signal CH supplied by the controller 30, the piezoelectric elements 11 and 12 to which the drive signal Com is to be supplied. The latch signal LAT defines the latch timing at which the print data Img is to be latched. The change signal CH defines the selection timing at which a drive pulse included in the drive signal Com is to be selected.

The controller 30 controls ink ejection operation of the liquid ejecting head 10. The controller 30 drives the first piezoelectric elements 11 to change the pressure of ink in pressure chambers C and to eject ink through nozzles N. The controller 30 also drives the second piezoelectric element 12 to control the flow of the liquid in a supply-side absorption chamber 44, described later, at ink ejection. Detailed configurations of the first piezoelectric element 11, the second piezoelectric element 12, the pressure chamber C, the nozzle N, the supply-side absorption chamber 44, and the like will be described later. The controller 30 controls ejection operation when performing a print operation.

A2. Configuration of Liquid Ejecting Head 10

Figure 3:
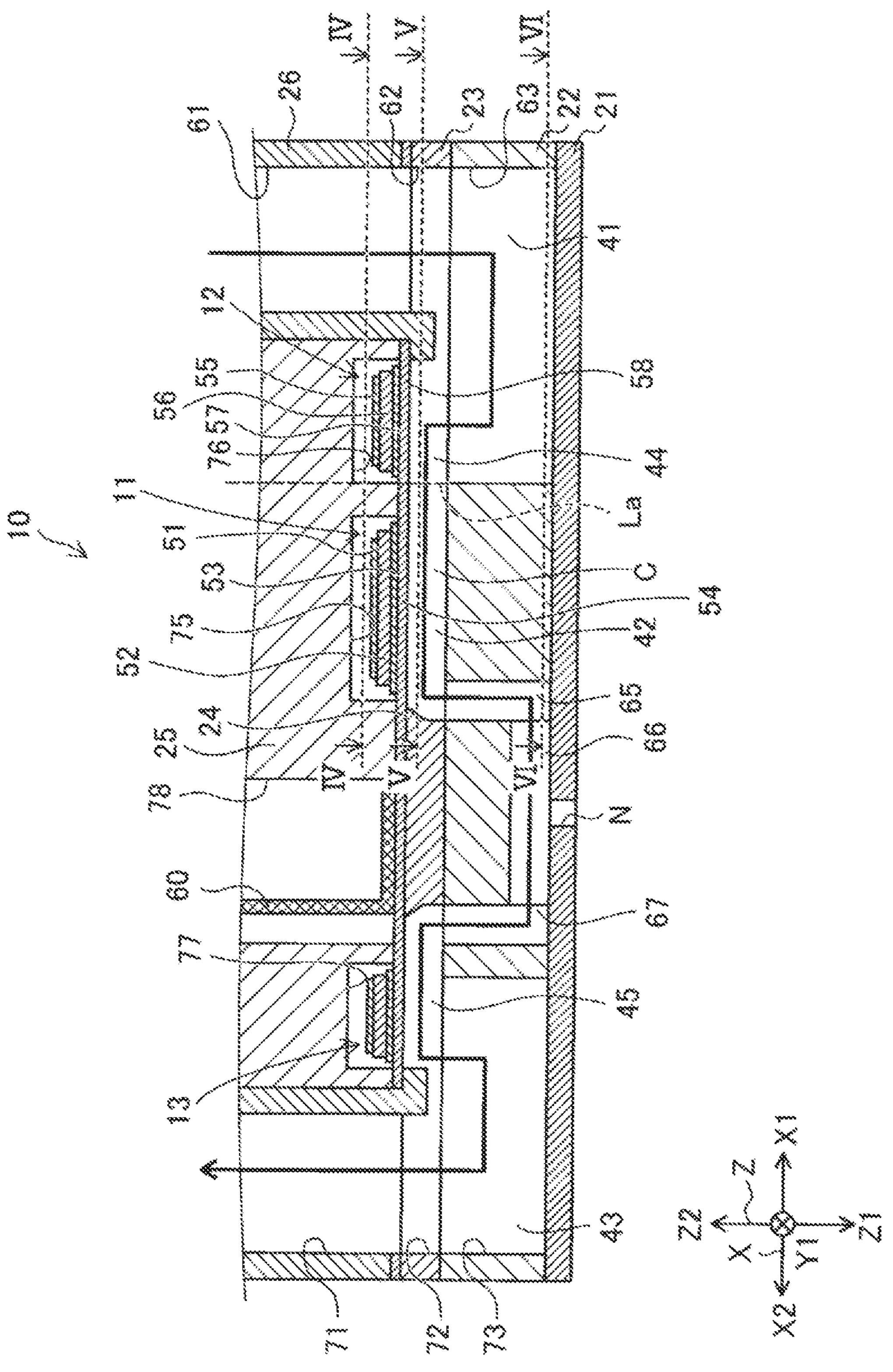
FIG. 3 is a partial cross-sectional view of a liquid ejecting head.

Next, the configuration of the liquid ejecting head 10 will be described. The liquid ejecting head 10 employs a circulation method in which liquid is circulated through a supply-side common flow path 41, individual flow paths 42, and a discharge-side common flow path 43 described later. FIG. 3 is a partial cross-sectional view of the liquid ejecting head 10. In the following description, the three directions intersecting one another are referred to as the X-axis direction, the Y-axis direction, and the Z-axis direction.

The X-axis direction corresponds to the right-left direction in FIG. 3 and includes the X1 direction (the right direction in FIG. 3) and the X2 direction (the left direction in FIG. 3) opposite to each other. The X-axis direction is an example of a third direction. The Y-axis direction includes the Y1 direction and the Y2 direction opposite to each other. The Y1 direction is the direction into the drawing plane in FIG. 3. The Y2 direction is the direction out of the drawing plane in FIG. 3. The Y-axis direction is an example of a first direction. The Z-axis direction corresponds to the up-down direction in FIG. 3 and includes the Z1 direction (the downward direction in FIG. 3) and the Z2 direction (the upward direction in FIG. 3) opposite to each other. The Z-axis direction is an example of a second direction.

In addition, the Z2 side is an example of a first side, and the Z1 side is an example of a second side. The X-axis direction, the Y-axis direction, and the Z-axis direction are orthogonal to one another. Although the Z-axis direction is typically the up-down direction, the Z-axis direction does not have to be the up-down direction. In the following description, the Z1 direction is referred to as "upward" in some cases, and the Z2 direction is referred to as "downward" in some cases.

In the present specification, the terms "supply side" and "discharge side" are used in some cases. The supply side is the portion of the liquid flow path upstream of the nozzles N. Components related to portions upstream of the nozzles N are referred to using "supply side" in some cases, and components related to portions downstream of the nozzles N are referred to using "discharge side" in some cases.

The liquid ejecting head 10 includes a nozzle substrate 21, a communication plate 22, a pressure chamber substrate 23, a vibration plate 24, a sealing plate 25, and piezoelectric elements 11, 12, and 13. The liquid ejecting head 10 also includes a case 26 and a COF 60. "COF" is an abbreviation for "chip on film". In addition, the liquid ejecting head 10 includes the supply-side common flow path 41, the plurality of individual flow paths 42, the discharge-side common flow path 43, the plurality of pressure chambers C, the supply-side absorption chamber 44, a discharge-side absorption chamber 45, the first piezoelectric elements 11, the second piezoelectric element 12, and a third piezoelectric element 13. Since the plurality of individual flow paths 42 and the plurality of pressure chambers C are aligned in the Y-axis direction, FIG. 3 illustrates only one each of these components. The present embodiment describes the liquid ejecting head 10 that ejects ink, which is an example of a liquid. The liquid is not limited to ink, and the liquid ejecting head 10 is configured to eject other types of liquid.

The thickness directions of the nozzle substrate 21, the communication plate 22, the pressure chamber substrate 23, the vibration plate 24, the sealing plate 25, and the case 26 correspond to the Z-axis direction. The nozzle substrate 21 is located at the bottom of the liquid ejecting head 10. The communication plate 22 is located on the Z2 direction side of the nozzle substrate 21. The pressure chamber substrate 23 is located on the Z2 direction side of the communication plate 22. In other words, the communication plate 22 is located between the pressure chamber substrate 23 and the nozzle substrate 21. The vibration plate 24 is located on the Z2 direction side of the pressure chamber substrate 23. The vibration plate 24 is formed of, for example, $SiO_2$. The vibration plate 24 is a member separate from the pressure chamber substrate 23. The vibration plate 24 may be attached to the pressure chamber substrate 23 with an adhesive or may be formed on the surface of the pressure chamber substrate 23 facing the Z2 direction by treatment such as thermal oxidation.

The sealing plate 25 is located on the Z2 direction side of the vibration plate 24. The sealing plate 25 covers the vibration plate 24, the plurality of piezoelectric elements 11, 12, and 13, and the pressure chamber substrate 23. The case 26 is located on the sealing plate 25. The first piezoelectric elements 11 are provided to be associated with the pressure chambers C.

Description of Flow Path

First, the liquid flow path formed in the liquid ejecting head 10 will be described. The liquid flow path includes a supply port and a discharge port (not illustrated), the supply-side common flow path 41, the plurality of individual flow paths 42, and the discharge-side common flow path 43. The boundary La between the supply-side common flow path 41 and the individual flow paths 42 is indicated by a dashed line in FIG. 3. Note that a publicly known flow restrictor (not illustrated) is provided at the boundary La between the supply-side common flow path 41 and each individual flow path 42.

The supply-side common flow path 41 is provided to be common to the plurality of pressure chambers C. The supply-side common flow path 41 is continuous in the Y-axis direction along the plurality of pressure chambers C. The supply-side common flow path 41 includes a liquid chamber portion 61 formed in the case 26, a liquid chamber portion 62 formed in the pressure chamber substrate 23, and a liquid chamber portion 63 formed in the communication plate 22. These liquid chamber portions 61, 62, and 63 are continuous in the Z-axis direction.

The supply-side absorption chamber 44 is located in the X1 direction relative to the pressure chambers C. The supply-side absorption chamber 44 communicates with upstream portions of the pressure chambers C. The supply-side absorption chamber 44 is part of the supply-side common flow path 41.

The plurality of individual flow paths 42 are provided for the respective pressure chambers C and aligned in the Y-axis direction. The individual flow paths 42 are located downstream of the supply-side common flow path 41. The individual flow paths 42 communicate with a downstream portion of the liquid chamber portion 62 formed in the pressure chamber substrate 23. Each individual flow path 42 includes a pressure chamber C, a first communication flow path 65, a second communication flow path 66, and a third communication flow path 67 in this order from upstream to downstream.

The plurality of pressure chambers C communicate with the respective nozzles N via the first communication flow paths 65 and the second communication flow paths 66. Each nozzle N is located in the Z1 direction relative to the corresponding pressure chamber C. The plurality of first communication flow paths 65 extend in the Z-axis direction. The plurality of second communication flow paths 66 are coupled to Z1-direction end portions of the first communication flow paths 65 and extend in the X2 direction. The nozzles N are located substantially at the center of the second communication flow paths 66 in the X-axis direction. The plurality of third communication flow paths 67 are coupled to X2-direction end portions of the second communication flow paths 66 and extend in the Z2 direction.

The discharge-side common flow path 43 is provided to be common to the plurality of pressure chambers C. The discharge-side common flow path 43 communicates in common with the plurality of individual flow paths 42. The discharge-side common flow path 43 communicates with each pressure chamber C via the corresponding individual flow path 42. The discharge-side common flow path 43 is located downstream of the individual flow paths 42.

The discharge-side common flow path 43 is continuous in the Y-axis direction. The discharge-side common flow path 43 includes a liquid chamber portion 71 formed in the case 26, a liquid chamber portion 72 formed in the pressure chamber substrate 23, and a liquid chamber portion 73 formed in the communication plate 22. These liquid chamber portions 71, 72, and 73 are continuous in the Z-axis direction.

Description of Each Substrate

Figure 4:
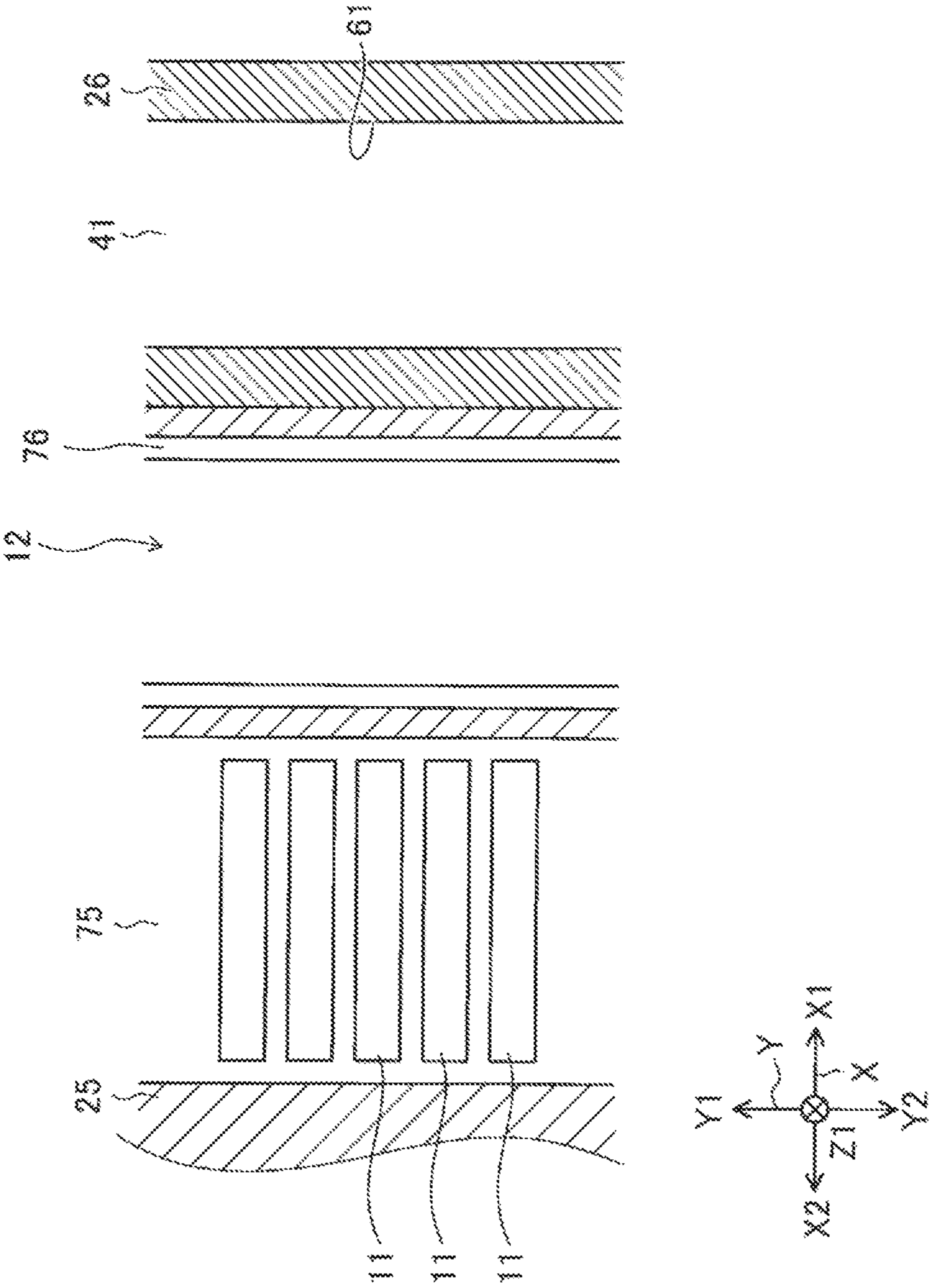
FIG. 4 is a cross-sectional view of the liquid ejecting head taken along line IV-IV in FIG. 3.
Figure 5:
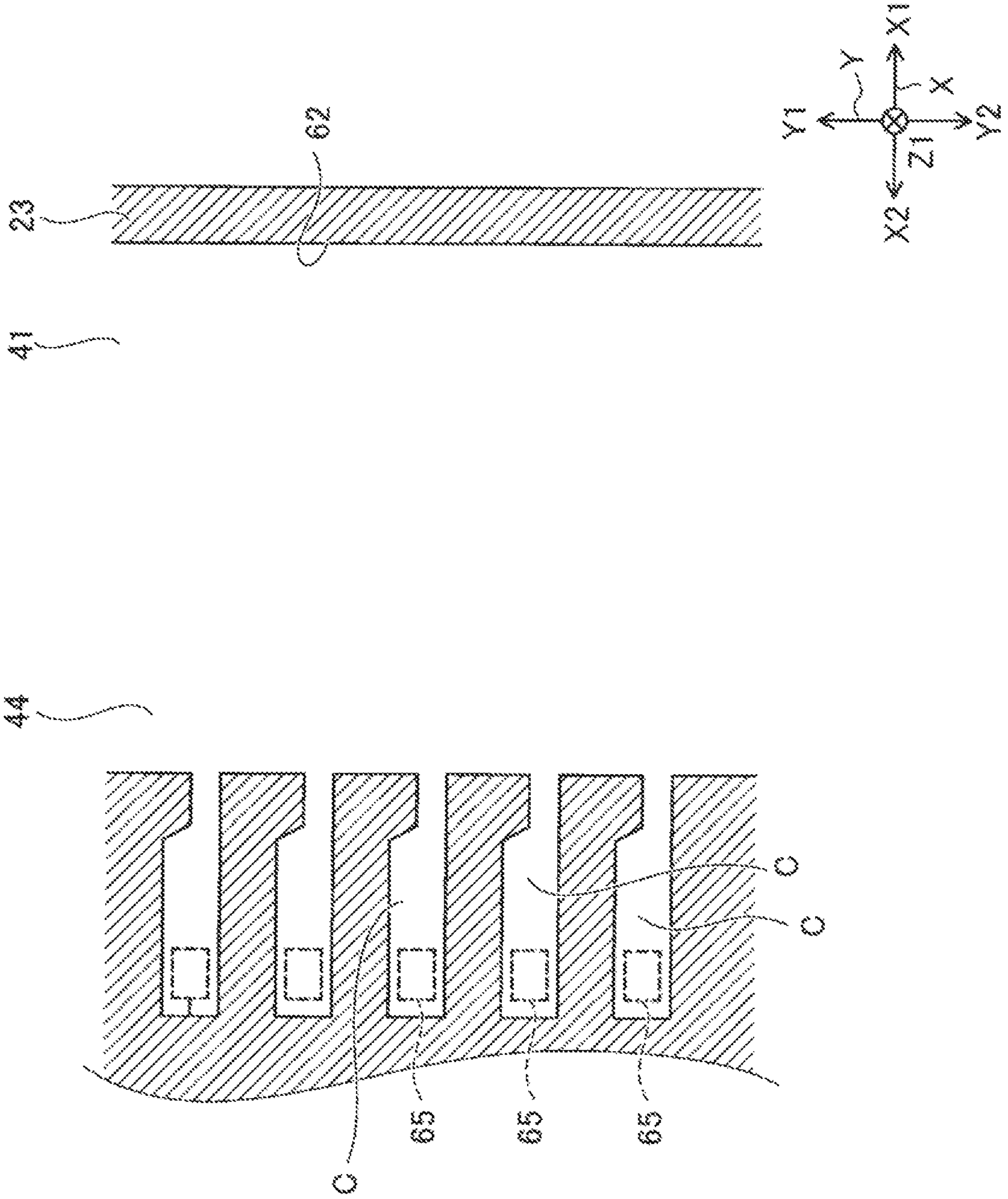
FIG. 5 is a cross-sectional view of the liquid ejecting head taken along line V-V in FIG. 3.
Figure 6:
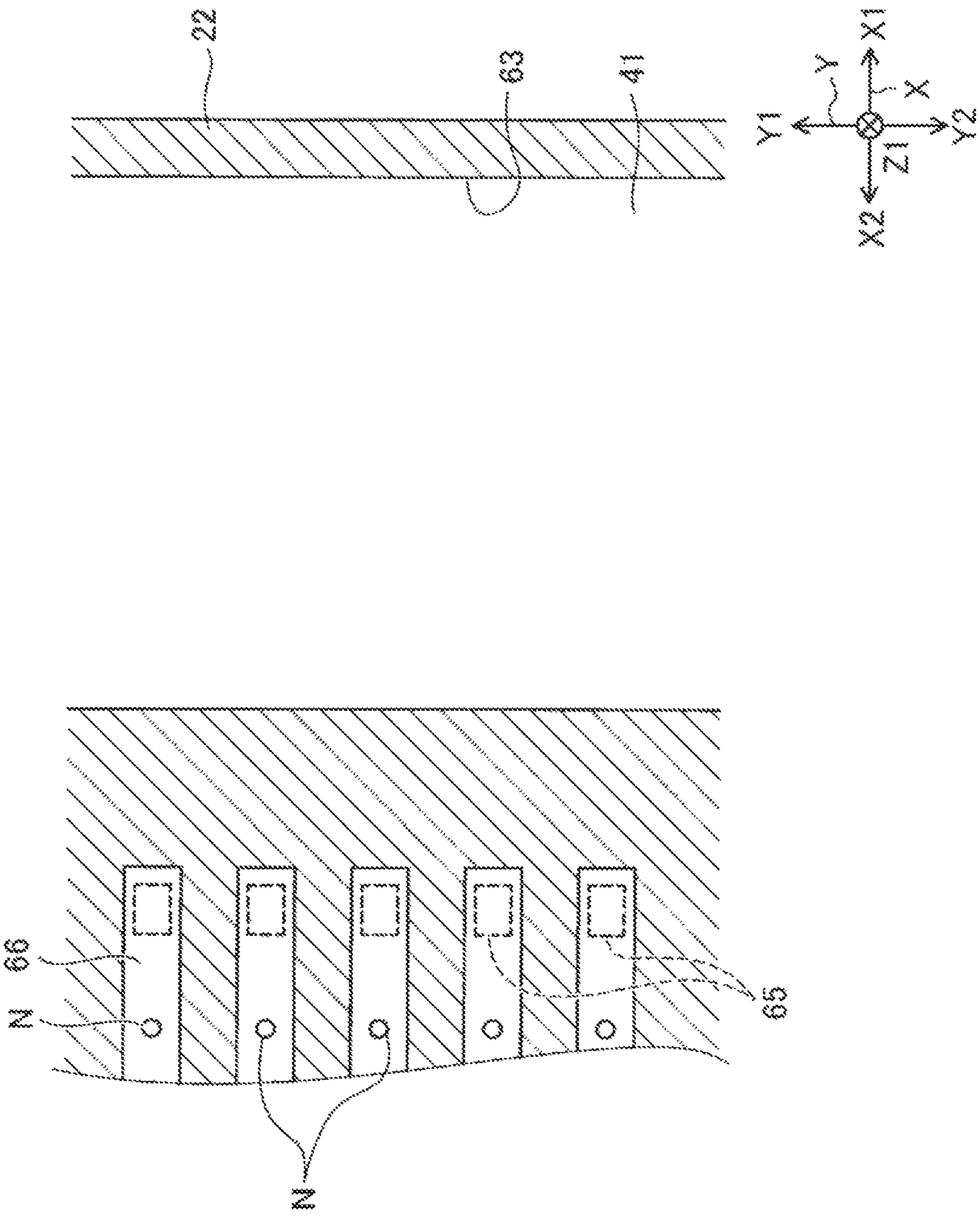
FIG. 6 is a cross-sectional view of the liquid ejecting head taken along line VI-VI in FIG. 3.

FIGS. 4 to 6 are cross-sectional views of the liquid ejecting head. FIG. 4 is a cross-sectional view taken along line IV-IV in FIG. 3, FIG. 5 is a cross-sectional view taken along line V-V in FIG. 3, and FIG. 6 is a cross-sectional view taken along line VI-VI in FIG. 3. In the following, the structure of each substrate included in the liquid ejecting head 10 will be described with reference to FIGS. 3 to 6 as necessary. As illustrated in FIG. 3, the nozzle substrate 21 has the nozzles N extending through the nozzle substrate 21 in the Z direction. As described above, the liquid ejecting head 10 ejects liquid through these nozzles N. In the nozzle substrate 21, the plurality of nozzles N arranged in the Y-axis direction form a nozzle row. The nozzle substrate 21 is formed of, for example, a metal such as stainless steel, an organic substance such as a polyimide resin, a silicon single crystal substrate, or the like.

As illustrated in FIGS. 3 and 5, the pressure chamber substrate 23 has the supply-side liquid chamber portion 62, the supply-side absorption chamber 44, the pressure chambers C, the discharge-side absorption chamber 45, and the discharge-side liquid chamber portion 72. The pressure chambers C, the absorption chambers 44 and 45, and the liquid chamber portions 62 and 72 are part of the liquid flow path. The pressure chambers C, the absorption chambers 44 and 45, and the liquid chamber portions 62 and 72 extend in the X-axis direction. The pressure chambers C, the absorption chambers 44 and 45, and the liquid chamber portions 62 and 72 each extend through the pressure chamber substrate 23 in the Z-axis direction. The pressure chambers C, the absorption chambers 44 and 45, and the liquid chamber portions 62 and 72 each have a specified capacity. Each of the absorption chambers 44 and 45 is a single chamber common to the plurality of pressure chambers C. In other words, each of the absorption chambers 44 and 45 is longer than a pressure chamber C in the Y-axis direction.

The plurality of pressure chambers C are aligned in the Y-axis direction at specified intervals. The set of pressure chambers C is located at the same position in the Y-axis direction as the supply-side absorption chamber 44 and the discharge-side absorption chamber 45. The pressure chambers C and the supply-side absorption chamber 44 located at the same position in the Y-axis direction adjoin each other and communicate with each other in the X direction. The supply-side liquid chamber portion 62, together with the liquid chamber portion 61 formed in the case 26 and the liquid chamber portion 63 formed in the communication plate 22, forms the supply-side common flow path 41.

The pressure chamber substrate 23 in the present embodiment is formed of a silicon single crystal substrate. In another embodiment, the pressure chamber substrate 23 may be formed of, for example, a metal such as stainless steel (SUS) or nickel (Ni); a ceramic material typified by zirconia ($ZrO_2$) or alumina ($Al_2O_3$); a glass-ceramic material; and an oxide such as magnesium oxide (MgO) or lanthanum aluminate ($LaAlO_3$); or the like. In the present embodiment, the pressure chambers C and the absorption chambers 44 and 45 are formed by, for example, processing the pressure chamber substrate 23 by anisotropic etching. Details of the functions of the pressure chambers C and the absorption chambers 44 and 45 will be described later.

The communication plate 22 is located between the nozzle substrate 21 and the pressure chamber substrate 23 and is fixed to the nozzle substrate 21 with an adhesive or the like. The communication plate 22 is formed of, for example, a silicon single crystal substrate. As illustrated in FIGS. 3 and 6, the communication plate 22 has the supply-side liquid chamber portion 63, the discharge-side liquid chamber portion 73, the first communication flow paths 65, the second communication flow paths 66, and the third communication flow paths 67. Each of the liquid chamber portions 63 and 73, the first communication flow paths 65, and the third communication flow paths 67 extends through the communication plate 22 in the Z direction. The second communication flow paths 66 do not extend through the communication plate 22 in the Z direction. The second communication flow paths 66 are recesses in the lower surface of the communication plate 22. Each nozzle N is coupled to the substantially intermediate position of the corresponding second communication flow path 66 in the X-axis direction. The liquid chamber portion 73, together with the liquid chamber portion 71 formed in the case 26 and the liquid chamber portion 72 formed in the pressure chamber substrate 23, forms the discharge-side common flow path 43.

As illustrated in FIG. 3, the sealing plate 25 is a member having recesses in the lower surface in the Z1 direction. The recesses are open on the Z2 side of the pressure chambers C and the absorption chambers 44 and 45 at the positions facing the pressure chambers C and the absorption chambers 44 and 45. Specifically, the recesses of the sealing plate 25 of the present embodiment are a first recess 75, a second recess 76, and a third recess 77.

The first recess 75 is open at a position facing the pressure chambers C. The second recess 76 is open at a position facing the supply-side absorption chamber 44. The third recess 77 is open at a position facing the discharge-side absorption chamber 45. The recesses 75, 76, and 77 are separated by wall portions formed as parts of the sealing plate 25. In the present embodiment, the depth of the opening in each of the recesses 75, 76, and 77 is the same. In other words, the dimension of each of the recesses 75, 76, and 77 in the Z direction is the same.

The recesses 75, 76, and 77 do not communicate with the liquid flow path, and hence, liquid does not flow in the recesses 75, 76, and 77. Of the widths of the recesses 75, 76, and 77 in the X-axis direction, the width of the first recess 75 is the largest, the width of the second recess 76 is the second largest, and the width of the third recess 77 is the smallest. As illustrated in FIGS. 3 and 4, the first recess 75, the second recess 76, and the third recess 77 extend across the width of the liquid ejecting head 10 in the Y-axis direction. The widths of the second recess 76 and the third recess 77 in the Y-axis direction are the same. The sealing plate 25 has a through hole 78 extending through the sealing plate 25 in the Z-axis direction at a position on the X2 direction side of the center portion in the X-axis direction. The above COF 60 is inserted into the through hole 78.

The vibration plate 24 is stacked on the pressure chamber substrate 23. The piezoelectric elements 11, 12, and 13 are stacked on the vibration plate 24. The plurality of first piezoelectric elements 11 are located in the first recess 75. The second piezoelectric element 12 is located in the second recess 76. The third piezoelectric element 13 is located in the third recess 77. The first piezoelectric elements 11 associated with the pressure chambers C located in the first recess 75 are actuators including a first electrode 51, a first piezoelectric material 52, second electrodes 53, and a first vibration plate 54 stacked in this order in the Z1 direction. The first piezoelectric elements 11 are for ejecting liquid. The first piezoelectric material 52 is driven by voltage application via the first electrode 51 and the second electrodes 53. The first vibration plate 54 is a portion of the vibration plate 24 on the X1 direction side of its center. The first electrode 51 is common to the plurality of pressure chambers C. The plurality of individual second electrodes 53 are provided to be associated with the plurality of pressure chambers C.

The second piezoelectric element 12 located in the second recess 76 is continuous in the Y-axis direction over the width in the Y-axis direction. The second piezoelectric element 12 is an actuator including a third electrode 55, a second piezoelectric material 56, a fourth electrode 57, and a second vibration plate 58 stacked in this order in the Z1 direction. The third electrode 55 is electrically separated from the first electrode 51 and the second electrodes 53. The fourth electrode 57 is electrically separated from the first electrode 51 and the second electrodes 53. The second piezoelectric material 56 is electrically separated from the first piezoelectric material 52. The second piezoelectric material 56 is driven by voltage application via the third electrode 55 and the fourth electrode 57. The second vibration plate 58 is a portion of the vibration plate 24 located close to an end portion further in the X1 direction relative to the foregoing first vibration plate 54. The first vibration plate 54 and the second vibration plate 58 are not separated and are formed as one continuous member.

As illustrated in FIG. 4, the second piezoelectric element 12 is common to the plurality of pressure chambers C. Specifically, for the absorption chamber 44, one each of the third electrode 55, the fourth electrode 57, and the second piezoelectric material 56 included in the second piezoelectric element 12 extend in the Y-axis direction. Note that the first electrode 51 and the third electrode 55 are formed of the same material, and the second electrodes 53 and the fourth electrode 57 are formed of the same material.

The first electrode 51 to the fourth electrode 57 are electrically coupled to different respective wiring portions. In FIG. 3, illustration of these wiring portions is omitted. The plurality of second electrodes 53 and the fourth electrode 57 are coupled to a plurality of COM wiring portions (not illustrated). The plurality of COM wiring portions extend in the X-axis direction and are led to the through hole 78 in the sealing plate 25. In FIG. 3, illustration of the COM wiring portions is omitted. The COM wiring portions are formed of a conductive material having a lower resistance than the first electrode 51. For example, the COM wiring portions are a conductive pattern having a structure in which a gold (Au) conductive film is stacked on the surface of a conductive film formed of nichrome (NiCr).

In the present embodiment, the third piezoelectric element 13 located in the third recess 77 also has a configuration including two electrodes and a piezoelectric material, as with the first and second piezoelectric elements. However, unlike the first and second piezoelectric elements 11 and 12, the piezoelectric element 13 located in the third recess 77 is not for applying pressure to the liquid in the flow path but for absorbing vibration. Hence, it is preferable that the piezoelectric element 13 not be electrically coupled to the controller 30.

A3. Description of Operation and Flow of Liquid

The liquid in the liquid container 2, being caused to flow by the pump 83, flows in the supply flow path 81 through the supply port (not illustrated) into the supply-side common flow path 41. The liquid in the supply-side common flow path 41 passes through the supply-side absorption chamber 44 and is supplied to the pressure chambers C which are parts of the individual flow paths 42. Some of the liquid in the pressure chambers C is ejected through the nozzles N.

The liquid not ejected through the nozzles N passes through the second communication flow paths 66, the third communication flow paths 67, and the discharge-side absorption chamber 45, which is part of the individual flow paths 42, and flows into the discharge-side common flow path 43. The liquid in the discharge-side common flow path 43 flows into the collection flow path 82 via the discharge port (not illustrated) and is collected into the liquid container 2. In the liquid ejecting head 10, liquid circulates as described above.

In the foregoing pressure chamber C, vibration of the vibration plate 24 applies pressure to the liquid in the pressure chamber C. The vibration plate 24 vibrates when the first piezoelectric element 11 is driven. Specifically, when a voltage is applied to the first piezoelectric material 52, piezoelectric strain occurs in an active portion of the first piezoelectric material 52, the active portion being stacked between the first electrode 51 and the second electrode 53 in the Z direction. The piezoelectric strain in the piezoelectric element 11 causes the vibration plate 24 to vibrate so as to bend, thereby changing the capacity of the pressure chamber to apply pressure to the liquid in the pressure chamber C.

A4. Liquid Ejection Control

Figure 7:
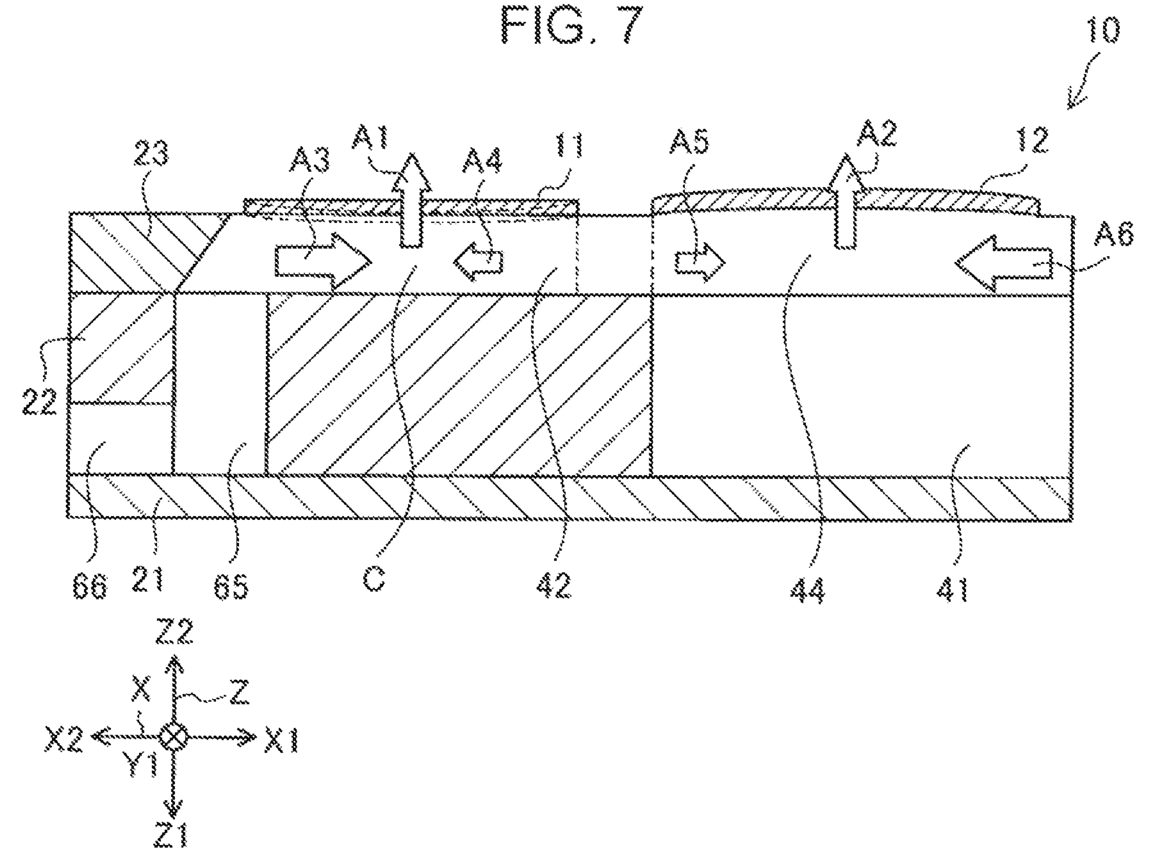
FIG. 7 is an explanatory diagram for schematically explaining the operation of a first piezoelectric element and a second piezoelectric element at liquid ejection.
Figure 8:
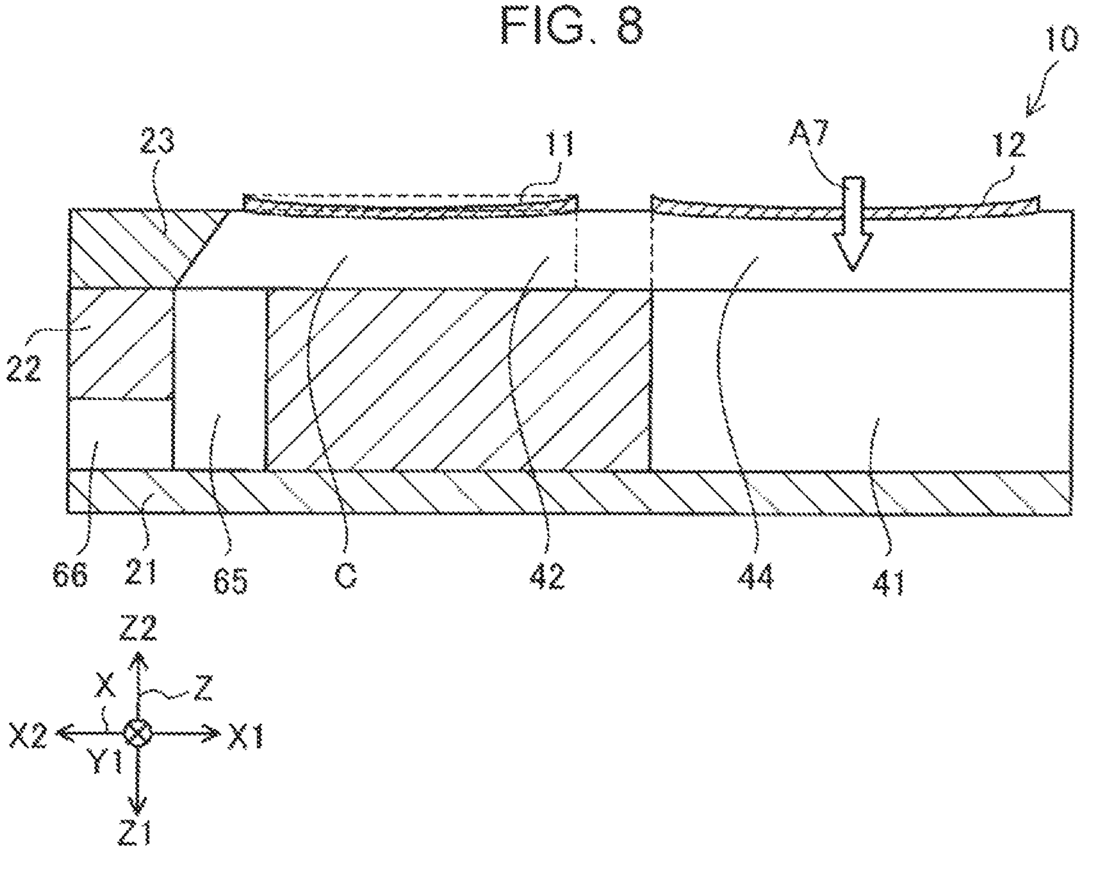
FIG. 8 is an explanatory diagram for schematically explaining the operation of the first piezoelectric element and the second piezoelectric element at liquid ejection.

FIGS. 7 and 8 are explanatory diagrams for schematically explaining the operation of the first piezoelectric element 11 and the second piezoelectric element 12 at liquid ejection. In FIGS. 7 and 8, detailed illustration of the first vibration plate 54, the second vibration plate 58, the electrodes 51, 53, 55, and 57, and the like is omitted, and simplified configurations of the piezoelectric elements 11 and 12 are illustrated. FIG. 7 illustrates a state at a second timing described later, and FIG. 8 illustrates a state at a first timing described later. As described earlier, the liquid ejecting head 10 ejects liquid through the nozzles N by applying pressure to the liquid in the pressure chambers C. The following describes liquid ejection control executed in the present embodiment together with its effects.

In the present embodiment, the first drive circuit 7*a* contracts the pressure chamber C at the first timing, which is a timing for ejecting liquid, and the second drive circuit 7*b* expands the supply-side absorption chamber 44 at the second timing, which is after the first timing. After the first piezoelectric element 11 bends in the Z1 direction to contract the pressure chamber C and ejects liquid through the nozzle N at the first timing, the first piezoelectric element 11 returns to its original form as indicated by arrow A1 in FIG. 7. This timing is referred to as the second timing. Specifically, at the second timing when the first piezoelectric element 11 returns to its original form in the Z2 direction, the second piezoelectric element 12 bends in the Z2 direction to expand the supply-side absorption chamber 44 as indicated by arrow A2 in FIG. 7. The phrase “at the second timing” indicates a timing after the first piezoelectric element 11 starts to be driven at the first timing. The second timing should preferably be set such that the expansion of the pressure chamber C that occurs when the first piezoelectric element 11, after the pressure chamber C contracts due to the first piezoelectric element 11 being driven, returns to the original state overlaps the expansion of the supply-side absorption chamber 44 in terms of time.

As described above, both the first piezoelectric element 11 and the second piezoelectric element 12 bend in the Z2 direction at the second timing. At this time, due to the operation of the first piezoelectric element 11, as illustrated in FIG. 7, the liquid in the pressure chamber C receives a force in a pull direction from the nozzle N to the pressure chamber C (the individual flow path 42) as indicated by arrow A3 and a force in a pull direction from the common flow path 41 to the individual flow path 42 as indicated by arrow A4. At this time, in the X-axis direction, as indicated by the sizes of arrows A3 and A4 (A3>A4), the force in the pull direction from the nozzle N to the pressure chamber C is stronger than the force in the pull direction from the common flow path 41 to the individual flow path 42. This is because the foregoing flow restrictor is provided at the boundary between the common flow path 41 and the individual flow path 42, which causes a difference in the ease of liquid flow in the flow path. Specifically, it is difficult for liquid to flow in the X2 direction from the flow restrictor, whereas it is easy for liquid to flow in the X1 direction from the first communication flow path 65, where a flow restrictor is not provided.

Similarly, due to the operation of the second piezoelectric element 12, the liquid in the supply-side absorption chamber 44 receives a force in a pull direction from the individual flow path 42 to the common flow path 41 as indicated by arrow A5 and a force in a pull direction from the upstream flow path to the common flow path 41 as indicated by arrow A6. At this time, in the X-axis direction, as indicated by the sizes of arrows A5 and A6 (A6>A5), the force in the pull direction from the upstream flow path to the common flow path 41 is stronger than the force in the pull direction from the individual flow path 42 to the common flow path 41. In FIG. 7, the forces indicated by arrows A3 to A6 are canceled in the X-axis direction in the entire flow path including the pressure chamber C and the supply-side absorption chamber 44.

For example, if the second piezoelectric element 12 is not driven at the second timing, the forces indicated by arrows A5 and A6 do not occur, and only the forces indicated by arrows A3 and A4 act. In this operation, since the force in the pull direction (A3) from the nozzle N to the pressure chamber C (the individual flow path 42) is stronger than the force in the pull direction (A4) from the common flow path 41 to the individual flow path 42, the liquid in the pressure chamber C receives a pulling force in the X1 direction from the nozzle N to the pressure chamber C (the individual flow path 42). Specifically, because the volume pulled from the nozzle N is large when the first piezoelectric element 11 returns to its original form, this pulling operation pulls in air. In this operation, if the pulling force from the common flow path 41 to the pressure chamber C is weak, it takes time to fill the pressure chamber C with liquid, which can hinder stable driving during high-speed ejection.

In this respect, after liquid is ejected through the nozzle N at the first timing, the second piezoelectric element 12 is driven at the second timing to expand the supply-side absorption chamber 44 in the first embodiment. This makes it easy to produce a state in which the supply-side common flow path 41 and the pressure chamber C are filled with liquid. This operation improves a refilling property. Note that "refilling property" denotes the performance of filling the pressure chamber C with liquid at liquid ejection. Since this configuration causes the pressure at liquid ejection through the nozzle N not to escape toward the supply-side common flow path 41, the ejection performance is stable.

In addition, in the present embodiment, the first drive circuit 7*a* expands the pressure chamber C at the foregoing second timing. In other words, the first drive circuit 7*a* expands the pressure chamber C at the second timing which is the same timing as the expansion of the supply-side absorption chamber 44 as described above. In addition to the movement of the first piezoelectric element 11 returning to its original form by itself at the second timing, the first piezoelectric element 11 is actively driven in the Z2 direction. Thus, a stronger force pulls liquid from the common flow path 41 into the pressure chamber C.

In addition, in the present embodiment, the first drive circuit 7*a* contracts the pressure chamber C at the first timing for ejecting liquid through the nozzle N, and the second drive circuit 7*b* contracts the supply-side absorption chamber 44 at the first timing. Specifically, as illustrated in FIG. 8, the second piezoelectric element 12 at the supply-side absorption chamber 44 is driven at the first timing for liquid ejection so as to bend in the Z1 direction as indicated by arrow A7, such that liquid is pushed from the common flow path 41 into the pressure chamber C. This operation reduces the pressure escaping along with the contraction of the pressure chamber C at ejection and makes it easy to fill the pressure chamber C with liquid thereafter.

Here, "at the first timing" denotes not only the case in which the timing at which the first piezoelectric element 11 starts to be driven and the timing at which the second piezoelectric element 12 starts to be driven are identical, but also a broad concept including some cases in which the timing at which the first piezoelectric element 11 contracts and the timing at which the second piezoelectric element 12 expands overlap.

In addition, in the present embodiment, the first drive circuit 7*a* contracts the pressure chamber C at the first timing, and the second drive circuit 7*b* expands the supply-side absorption chamber 44 at a third timing before the first timing. Specifically, at the third timing before liquid ejection, the second piezoelectric element 12 is driven to expand the supply-side absorption chamber 44. Since this operation increases the reduced volume, it is possible to pull in liquid from the upstream portion of the common flow path to a portion near the pressure chamber C, which makes it easy for liquid to flow toward the pressure chamber C at liquid ejection. In other words, the refilling property is improved.

The liquid ejecting head 10 and the liquid ejecting apparatus 1 of the first embodiment described above further provide the following effects. In the first embodiment described above, the piezoelectric elements 11, 12, and 13 can be formed by a known method, such as etching or the like using a photoresist for masking. For example, when the members included in the actuators including the first piezoelectric elements 11 in the first recess 75 are formed, the members included in the second piezoelectric element 12 and the third piezoelectric element 13 can be formed by a method the same as or similar to the method by which the members included in the actuators are formed. Thus, it is possible to easily form each piezoelectric element by using members of the same material as that of the actuators.

In the liquid ejecting head 10 and the liquid ejecting apparatus 1 of the first embodiment described above, the first electrode 51 and the third electrode 55 are formed of the same material, and the second electrodes 53 and the fourth electrode 57 are formed of the same material. Thus, each combination of the electrodes can be formed as one layer in the same manufacturing process, which simplifies the manufacturing process.

In the liquid ejecting head 10 and the liquid ejecting apparatus of the first embodiment described above, the first vibration plate 54 and the second vibration plate 58 are not separated and are formed as one continuous member. This configuration prevents an increase in the number of manufacturing processes that would be required due to such separation.

B. Second Embodiment

Figure 9:
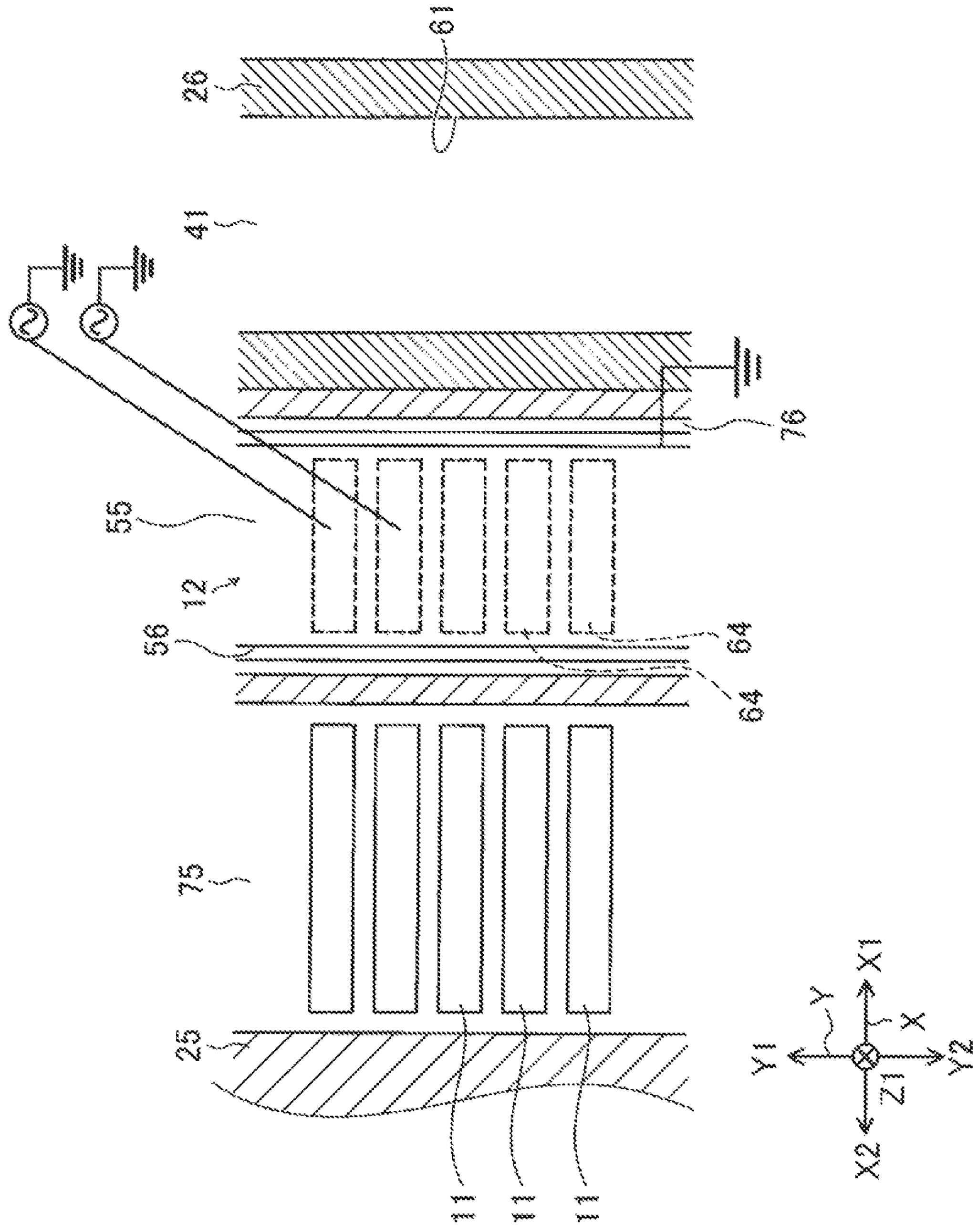
FIG. 9 is a cross-sectional view of a liquid ejecting head in a second embodiment of the present disclosure.

Next, a second embodiment of the present disclosure will be described with reference to FIG. 9. Note that the components substantially the same as those in the foregoing first embodiment are denoted by the same or similar symbols, and description thereof is omitted. FIG. 9 is a cross-sectional view of a liquid ejecting head in the second embodiment of the present disclosure. The liquid ejecting head 10 of the second embodiment is different from the liquid ejecting head 10 of the foregoing first embodiment in that the second piezoelectric element 12 includes a plurality of fourth electrodes 64 provided so as to be associated with the plurality of pressure chambers C at the supply-side absorption chamber 44. The third electrode 55 and the second piezoelectric material 56 are provided in common to the plurality of pressure chambers C as in the foregoing first embodiment. The common third electrode 55 is grounded at 0 volts.

This configuration also provides effects the same as or similar to those of the foregoing first embodiment. In addition, since only the second piezoelectric elements 12 at the segment positions corresponding to the nozzles N that eject liquid can be driven, it is possible to mitigate effects of driving of second piezoelectric elements 12 to the nozzles N not ejecting liquid. This configuration is effective especially for a pattern printing or the like in which some nozzles N eject liquid and the other nozzles N do not.

C. Other Configurations (C1) Although the liquid ejecting apparatus 1 in the foregoing embodiments employs a circulation head in which the liquid that flows into the liquid ejecting head

10 circulates, the liquid ejecting apparatus 1 may employ a non-circulating head in which liquid does not circulate.

Figure 10:
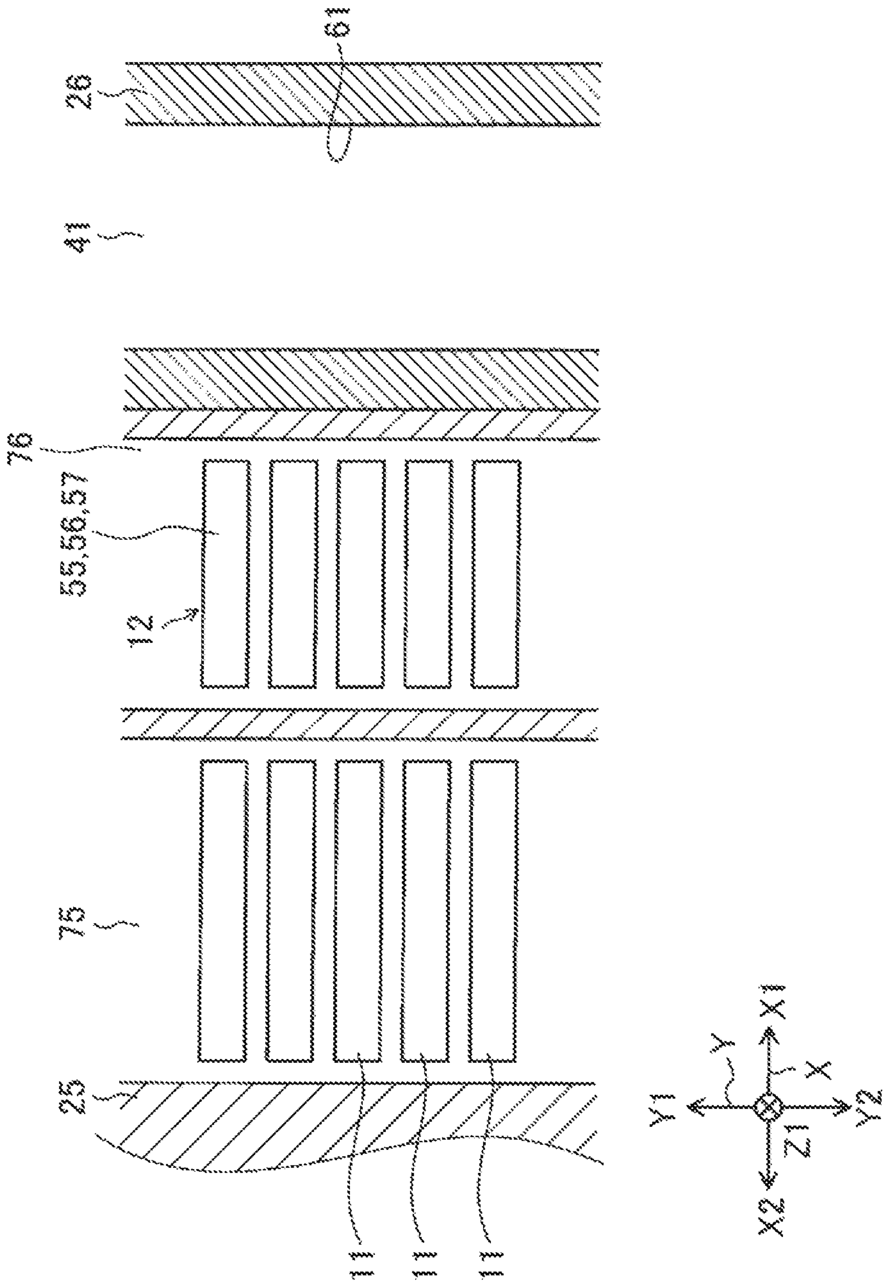
FIG. 10 is a cross-sectional view of a liquid ejecting head according to another embodiment of the present disclosure.

(C2) In the liquid ejecting apparatus 1 of the foregoing first embodiment, the second piezoelectric element 12 at the supply-side absorption chamber 44 includes only one each of the third electrode 55, the fourth electrode 57, and the second piezoelectric material 56. FIG. 10 is a cross-sectional view of a liquid ejecting head according to another embodiment of the present disclosure. Instead of the foregoing configuration, a plurality of third electrodes 55, a plurality of fourth electrodes 57, and a plurality of second piezoelectric materials 56 may be provided so as to be associated with the plurality of pressure chambers C at the supply-side absorption chamber 44, as illustrated in FIG. 10.

(C3) Although each of the piezoelectric elements 11, 12, and 13 has a configuration having two electrodes on both sides in the Z-axis direction in the liquid ejecting apparatus 1 of the foregoing embodiments, a configuration without one side of the electrodes is possible. The second piezoelectric element 12 needs only to be driven independently of the first piezoelectric elements 11.

(C4) Although the first electrode 51 and the third electrode 55 are formed of the same material in the liquid ejecting apparatus 1 of the foregoing embodiments, the first electrode 51 and the third electrode 55 may be formed of different materials. Similarly, the second electrodes 53 and the fourth electrodes 57 and 64 may be formed of different materials.

(C5) Although the supply-side absorption chamber 44 is expanded at the second timing in the liquid ejection control of the liquid ejecting apparatus 1 of the foregoing embodiments, a configuration only including the contraction of the pressure chamber C at the first timing is possible. In addition, control of expanding the pressure chamber C at the second timing, control of expanding the supply-side absorption chamber 44 at the third timing, or the like may be omitted as appropriate.

The present disclosure is not limited to the foregoing embodiments and can be implemented in various configurations within a scope not departing from the spirit of present disclosure. For example, the technical features in the embodiments corresponding to the technical features in the aspects described in the summary of the disclosure can be replaced or combined as appropriate to solve some or all of the foregoing problems or to achieve some or all of the foregoing advantageous effects. In addition, unless technical features are described as essential ones in the present specification, they can be omitted as appropriate.

(1) One aspect of the present disclosure provides a liquid ejecting head. The liquid ejecting head includes: a nozzle substrate having a nozzle configured to eject liquid; a pressure chamber substrate having a pressure chamber in which a pressure for ejecting liquid through the nozzle is applied to liquid and an absorption chamber adjacent to an upstream portion of the pressure chamber and configured to absorb vibration of liquid that occurs when a pressure is applied to the liquid in the pressure chamber; a first piezoelectric element associated with the pressure chamber and configured to be driven by voltage application; and a second piezoelectric element associated with the absorption chamber and configured to be driven independently of the first piezoelectric element by voltage application. Since this configuration has the second piezoelectric element associated with the absorption chamber and configured to be driven by voltage application independently of the first piezoelectric element associated with the pressure chamber and configured to be driven by voltage application, this configuration can solve various issues regarding the liquid ejecting head. For example, the pressure chamber can be quickly filled with liquid, and since the structure for absorbing vibration can be small, the head can be downsized.

(2) In the liquid ejecting head of the above aspect, the first piezoelectric element may include a first electrode, a second electrode, a first piezoelectric material configured to be driven by voltage application via the first electrode and the second electrode, and a first vibration plate configured to vibrate when the first piezoelectric material is driven. With this configuration, the first piezoelectric element for ejection can be formed with a simple structure including the first electrode, the second electrode, the first piezoelectric material, and the first vibration plate.

(3) In the liquid ejecting head of the above aspect, the second piezoelectric element may include a third electrode electrically separated from the first electrode and the second electrode, a fourth electrode electrically separated from the first electrode and the second electrode, a second piezoelectric material electrically separated from the first piezoelectric material and configured to be driven by voltage application via the third electrode and the fourth electrode, and a second vibration plate configured to vibrate when the second piezoelectric material is driven. With this configuration, the second piezoelectric element can be easily formed so as to be driven independently of the first piezoelectric element.

(4) In the liquid ejecting head of the above aspect, the first electrode and the third electrode may be formed of an identical material, and the second electrode and the fourth electrode may be formed of an identical material. In this configuration, since each of the combination of the first electrode and the third electrode and the combination of the second electrode and the fourth electrode can be formed in the same manufacturing process, the manufacturing process can be simplified.

(5) In the liquid ejecting head of the above aspect, a configuration in which the first vibration plate and the second vibration plate are not separated and are formed as one continuous member is possible. This configuration prevents an increase in the number of manufacturing processes that would be required due to such separation of the vibration plate.

(6) In the liquid ejecting head of the above aspect, the pressure chamber substrate may have a plurality of the pressure chambers and the absorption chamber common to the plurality of pressure chambers.

(7) In the liquid ejecting head of the above aspect, the first electrode may be provided to be common to the plurality of pressure chambers, and the second electrode may be provided individually for each of the pressure chambers.

(8) In the liquid ejecting head of the above aspect, the third electrode may be provided at the absorption chamber, the fourth electrode may be provided at the absorption chamber, and the second piezoelectric material may be provided at the absorption chamber.

(9) In the liquid ejecting head of the above aspect, the third electrode may be provided at the absorption chamber, a plurality of the fourth electrodes may be provided at the absorption chamber so as to be associated with the plurality of pressure chambers, and the second piezoelectric material may be provided at the absorption chamber.

(10) In the liquid ejecting head of the above aspect, a plurality of the third electrodes may be provided at the absorption chamber so as to be associated with the plurality of pressure chambers, a plurality of the fourth electrodes may be provided at the absorption chamber so as to be associated with the plurality of pressure chambers, and a plurality of the second piezoelectric materials may be provided at the absorption chamber so as to be associated with the plurality of pressure chambers.

(11) The liquid ejecting head of the above aspect may further include a first drive circuit configured to apply a voltage to at least one of the first electrode and the second electrode; and a second drive circuit configured to apply a voltage to at least one of the third electrode and the fourth electrode. With this configuration, it is possible to drive the first piezoelectric element with the first drive circuit, and to drive the second piezoelectric element with the second drive circuit.

(12) In the liquid ejecting head of the above aspect, the first drive circuit may contract the pressure chamber at a first timing, and the second drive circuit may expand the absorption chamber at a second timing which is after the first timing. In this configuration, since the second piezoelectric element is driven at the second timing to expand the supply-side absorption chamber after liquid is ejected at the first timing, it is easy to produce a state in which the pressure chamber is filled with liquid. This operation improves the refilling property.

(13) In the liquid ejecting head of the above aspect, the first drive circuit may expand the pressure chamber at the second timing. In this configuration, since the pressure chamber is expanded at the second timing when the absorption chamber is expanded, this further improves the refilling property.

(14) In the liquid ejecting head of the above aspect, the first drive circuit may contract the pressure chamber at a first timing, and the second drive circuit may contract the absorption chamber at the first timing. In this configuration, since the pressure chamber and the absorption chamber are contracted at the same time at the first timing, it is possible to reduce the amount of pressure escape from the pressure chamber caused along with the contraction of the pressure chamber at ejection.

(15) In the liquid ejecting head of the above aspect, the first drive circuit may contract the pressure chamber at a first timing, and the second drive circuit may expand the absorption chamber at a third timing which is before the first timing. In this configuration, since the absorption chamber is expanded at the third timing before liquid ejection to increase the reduced volume, it is possible to improve the refilling property.

(16) Another aspect of the present disclosure provides a liquid ejecting apparatus. The liquid ejecting apparatus includes: the liquid ejecting head according to the foregoing one aspect; and a controller configured to control ejection operation of ejecting liquid from the liquid ejecting head. This configuration enables sufficient vibration absorption and mitigates an increase in the size of the liquid ejecting head.

The present disclosure can be applied not only to ink jet liquid ejecting apparatuses but also to any liquid ejecting apparatuses that eject liquid other than ink. For example, the present disclosure is applicable to the following various kinds of liquid ejecting apparatuses.

(1) Image printing apparatuses such as fax machines.
(2) Coloring-material ejecting apparatuses used for manufacturing color filters for image display apparatuses such as liquid crystal displays.
(3) Electrode-material ejecting apparatuses used for forming electrodes of organic electro luminescence (EL) displays, field emission displays (FEDs), and the like.
(4) Liquid ejecting apparatuses that eject a liquid containing bio-organic matter used for manufacturing biochips.
(5) Specimen ejecting apparatuses used as precision pipettes.
(6) Lubricating-oil ejecting apparatuses.
(7) Resin-liquid ejecting apparatuses.
(8) Liquid ejecting apparatuses that eject lubricating oil to precision machines such as watches and cameras in a pinpoint manner.
(9) Liquid ejecting apparatus that eject a transparent resin liquid such as a UV curable resin liquid onto a substrate to form micro hemispherical lenses (optical lenses) or the like used in optical communication devices.
(10) Liquid ejecting apparatuses that eject an acidic or alkaline etchant to etch a substrate or the like.
(11) Liquid ejecting apparatuses including a liquid consuming head that ejects droplets including a small amount of liquid of any other kinds.

Note that "droplets" denotes a state of liquid ejected from a liquid ejecting apparatus and include ones with shapes leaving tails having granular shapes, tear-like shapes, and thread-like shapes. Here, "liquid" denotes any material that can be consumed by a liquid ejecting apparatus. For example, "liquid" may refer to a material in a state in which the substances are in a liquid phase and includes materials in the liquid state having a high or low viscosity; sol; gel water; and other materials in a liquid state such as inorganic solvents, organic solvents, solutions, liquid resins, and liquid metals (metal melt). The term "liquid" includes not only liquid as one state of a substance but also solvents in which particles of functional materials composed of solid substances, such as pigments and metal particles, are dissolved, dispersed, or mixed, for example. Typical examples of combinations of a first liquid and a second liquid include the following, in addition to the combination of ink and a reaction liquid described in the above embodiments.

(1) A main agent and a curing agent in an adhesive
(2) A base paint and a diluent for a paint, and a clear paint and a diluent
(3) A main solvent containing cells and a dilution solvent for ink for cells
(4) A metallic leaf pigment dispersion and a dilution solvent for ink (metallic ink) that exhibits metallic luster
(5) Gasoline, light oil, and biofuel for vehicle fuel
(6) Base components and protective components for medicines
(7) Phosphors and encapsulants for light-emitting diodes (LEDs)

In addition, the present disclosure can be implemented, in addition to the aspects as the foregoing liquid ejecting head and liquid ejecting apparatus, in various aspects such as a liquid ejecting system and a multifunction printer including a liquid ejecting apparatus.

What is claimed is:

1. A liquid ejecting head comprising:

a nozzle substrate having a nozzle configured to eject liquid;

a pressure chamber substrate having a pressure chamber in which a pressure for ejecting liquid through the nozzle is applied to liquid and an absorption chamber adjacent to an upstream portion of the pressure chamber and configured to absorb vibration of liquid that occurs when a pressure is applied to the liquid in the pressure chamber;

a first piezoelectric element associated with the pressure chamber and configured to be driven by voltage application; and a second piezoelectric element associated with the absorption chamber and configured to be driven independently of the first piezoelectric element by voltage application.

2. The liquid ejecting head according to claim 1, wherein the first piezoelectric element includes a first electrode, a second electrode, a first piezoelectric material configured to be driven by voltage application via the first electrode and the second electrode, and a first vibration plate configured to vibrate when the first piezoelectric material is driven.

3. The liquid ejecting head according to claim 2, wherein the second piezoelectric element includes a third electrode electrically separated from the first electrode and the second electrode, a fourth electrode electrically separated from the first electrode and the second electrode, a second piezoelectric material electrically separated from the first piezoelectric material and configured to be driven by voltage application via the third electrode and the fourth electrode, and a second vibration plate configured to vibrate when the second piezoelectric material is driven.

4. The liquid ejecting head according to claim 3, wherein the first electrode and the third electrode are formed of an identical material, and the second electrode and the fourth electrode are formed of an identical material.

5. The liquid ejecting head according to claim 3, wherein the first vibration plate and the second vibration plate are not separated and are formed as one continuous member.

6. The liquid ejecting head according to claim 3, wherein the pressure chamber substrate has a plurality of the pressure chambers and the absorption chamber common to the plurality of pressure chambers.

7. The liquid ejecting head according to claim 6, wherein the first electrode is provided to be common to the plurality of pressure chambers, and the second electrode is provided individually for each of the pressure chambers.

8. The liquid ejecting head according to claim 7, wherein the third electrode is provided at the absorption chamber, the fourth electrode is provided at the absorption chamber, and the second piezoelectric material is provided at the absorption chamber.

9. The liquid ejecting head according to claim 7, wherein the third electrode is provided at the absorption chamber, a plurality of the fourth electrodes are provided at the absorption chamber so as to be associated with the plurality of pressure chambers, and the second piezoelectric material is provided at the absorption chamber.

10. The liquid ejecting head according to claim 7, wherein a plurality of the third electrodes are provided at the absorption chamber so as to be associated with the plurality of pressure chambers, a plurality of the fourth electrodes are provided at the absorption chamber so as to be associated with the plurality of pressure chambers, and a plurality of the second piezoelectric materials are provided at the absorption chamber so as to be associated with the plurality of pressure chambers.

11. The liquid ejecting head according to claim 3, further comprising:

a first drive circuit configured to apply a voltage to at least one of the first electrode and the second electrode; and a second drive circuit configured to apply a voltage to at least one of the third electrode and the fourth electrode.

12. The liquid ejecting head according to claim 11, wherein the first drive circuit contracts the pressure chamber at a first timing, and the second drive circuit expands the absorption chamber at a second timing which is after the first timing.

13. The liquid ejecting head according to claim 12, wherein the first drive circuit expands the pressure chamber at the second timing.

14. The liquid ejecting head according to claim 11, wherein the first drive circuit contracts the pressure chamber at a first timing, and the second drive circuit contracts the absorption chamber at the first timing.

15. The liquid ejecting head according to claim 11, wherein the first drive circuit contracts the pressure chamber at a first timing, and the second drive circuit expands the absorption chamber at a third timing which is before the first timing.

16. A liquid ejecting apparatus comprising:

the liquid ejecting head according to claim 1; and a controller configured to control ejection operation of ejecting liquid from the liquid ejecting head.

* * * * *